United States Patent
Dastidar

(10) Patent No.: US 11,340,439 B2
(45) Date of Patent: May 24, 2022

(54) METHOD AND SYSTEM FOR AUTO FOCUSING A MICROSCOPIC IMAGING SYSTEM

(71) Applicant: SIGTUPLE TECHNOLOGIES PRIVATE LIMITED, Karnataka (IN)

(72) Inventor: Tathagato Rai Dastidar, Karnataka (IN)

(73) Assignee: Sigtuple Technologies Private Limited, Karnataka (IN)

( * ) Notice: Subject to any disclaimer, the term of this patent is extended or adjusted under 35 U.S.C. 154(b) by 0 days.

(21) Appl. No.: 16/620,749

(22) PCT Filed: Jun. 18, 2019

(86) PCT No.: PCT/IN2019/050461
§ 371 (c)(1),
(2) Date: Dec. 9, 2019

(87) PCT Pub. No.: WO2020/188584
PCT Pub. Date: Sep. 24, 2020

(65) Prior Publication Data
US 2021/0405339 A1    Dec. 30, 2021

(30) Foreign Application Priority Data
Mar. 21, 2019   (IN) .............................. 201941011025

(51) Int. Cl.
*G06K 9/40* (2006.01)
*G02B 21/24* (2006.01)
(Continued)

(52) U.S. Cl.
CPC ............. *G02B 21/244* (2013.01); *G02B 7/38* (2013.01); *G02B 21/26* (2013.01); *G02B 21/365* (2013.01);
(Continued)

(58) Field of Classification Search
CPC ........ G02B 21/244; G02B 7/38; G02B 21/26; G02B 21/365; G06T 7/0002; G06T 7/80;
(Continued)

(56) References Cited

U.S. PATENT DOCUMENTS

| | | | |
|---|---|---|---|
| 8,111,938 B2 * | 2/2012 | Bryll ...................... | G03B 13/36 382/255 |
| 2011/0249910 A1 * | 10/2011 | Henderson ........... | G06V 10/993 382/278 |
| 2012/0127297 A1 * | 5/2012 | Baxi .................... | G06V 10/993 382/173 |

FOREIGN PATENT DOCUMENTS

| | | | | |
|---|---|---|---|---|
| WO | WO-2012/105966 | | 8/2012 | |
| WO | WO2012/105966 A1 * | 9/2021 | ............. | G02B 21/24 |

OTHER PUBLICATIONS

International Search Report and Written Opinion for PCT Application No. PCT/IN2019/050461, dated Sep. 16, 2019.

* cited by examiner

Primary Examiner — Howard D Brown, Jr.
(74) Attorney, Agent, or Firm — Foley & Lardner LLP

(57) ABSTRACT

The present disclosure provides method and system for auto focusing a microscopic imaging system using machine learned regression system such as Convolutional Neural Network (CNN). The method comprises receiving a first image of a sample under review and a second image of sample wherein the first image is captured at first focus position and second image is captured at second focus position. The CNN is trained using the plurality of historic difference images along with direction of focus and optimal focus position. The difference of two images are obtained in terms of difference in pixel values. The direction of focus and optimal focus position for difference image is identified based on plurality of historic difference images along with (Continued)

direction of focus and optimal focus position. The method enables automated stage comprising sample to move towards direction of focus and position at optimal focus position for capturing a focused image.

30 Claims, 5 Drawing Sheets

(51) Int. Cl.
*G06T 7/80* (2017.01)
*G06T 7/00* (2017.01)
*G02B 7/38* (2021.01)
*G02B 21/26* (2006.01)
*G02B 21/36* (2006.01)

(52) U.S. Cl.
CPC .............. *G06T 7/0002* (2013.01); *G06T 7/80* (2017.01); *G06T 7/97* (2017.01); *G06T 2207/10148* (2013.01); *G06T 2207/20021* (2013.01); *G06T 2207/20081* (2013.01); *G06T 2207/30168* (2013.01)

(58) Field of Classification Search
CPC ............. G06T 7/97; G06T 2207/10148; G06T 2207/20021; G06T 2207/20081; G06T 2207/30168
See application file for complete search history.

METHOD AND SYSTEM FOR AUTO FOCUSING A MICROSCOPIC IMAGING SYSTEM

CROSS-REFERENCE TO RELATED APPLICATIONS

This Application is the U.S. national phase of PCT Application No. PCT/IN2019/050461, filed on Jun. 18, 2019, which claims the benefit of and priority to IN Application No. 201941011025, filed on Mar. 21, 2019, the contents of each of which are herein incorporated by reference in their entireties.

TECHNICAL FIELD

The present subject matter is generally related to microscopic imaging system and more particularly, but not exclusively, to method and system for autofocusing a microscopic imaging system.

BACKGROUND

Manual microscopic review of biological samples remains the standard for diagnosis of diseases in several types of sample. This may include analysis of tissues (histopathology), blood (haematology), study of microorganisms (microbiology), and the like. Imaging systems such as automated digital microscopes, also known as Whole Slide Scanner (WSI) systems, aim to partially automate the review process.

An essential component of any automated microscope is the auto focus system, which brings the sample at an optimal position in a vertical axis for it to be imaged without defocus artefacts. However, despite advances in image capture speed and digital compute speed, automated microscopes still cannot match the performance of a skilled human operator while focusing on a given field of view or while keeping the sample in focus during observation.

There exists some focusing techniques applicable to specific biological samples. One of the existing techniques talks about training a deep learning model to predict defocus distance. In this technique, a single image from the focus stack is taken as input, and the deep learning model predicts the distance to the optimal focus position relative to the position where the image is taken. This technique achieves expected results only for a given sample preparation method which the deep learning model has been trained with and hence the performance would differ when the technique is executed at a different site with different sample preparation and staining protocol. Also, the performance is not better when using coherent light sources such as a dual green Light Emitting Diode (LED) and a single green LED.

The information disclosed in this background of the disclosure section is only for enhancement of understanding of the general background of the invention and should not be taken as an acknowledgement or any form of suggestion that this information forms the prior art already known to a person skilled in the art.

SUMMARY

The present disclosure provides a method for auto focusing a microscopic imaging system. The method comprises receiving, by a focusing system of microscopic imaging system, a first image of a sample in an automated stage of the microscopic imaging system, wherein the first image is captured at a first focus position. The method further comprises receiving, by the focusing system, a second image of the sample in the automated stage, wherein the second image is captured at a second focus position. Thereafter, a difference image is identified based on difference in pixel values of the first image and the second image. The method further comprises identifying a direction of focus and optimal focus position for the difference image based on information associated with plurality of historic difference images. Thereafter, the method enables the automated stage to move towards the direction of focus and position at the optimal focus position to capture a focused image of the sample.

The present disclosure provides a focusing system for auto focusing a microscopic imaging system. The focusing system comprises a processor and a memory communicatively coupled to the processor, wherein the memory stores the processor-executable instructions, which, on execution, causes the processor to receive a first image of a sample in an automated stage of the microscopic imaging system, wherein the first image is captured at a first focus position. The processor also receives a second image of the sample in the automated stage, wherein the second image is captured at a second focus position. Upon receiving the first image and the second image, the processor identifies a difference image based on difference in pixel values of the first image and the second image. Thereafter, the processor identifies a direction of focus and optimal focus position for the difference image based on information associated with plurality of historic difference images. Further, the processor facilitates the automated stage to move towards the direction of focus and position at the optimal focus position to capture a focused image of the sample.

Furthermore, the present disclosure provides a microscopic imaging system comprising an image capturing unit for capturing one or more images of a sample, an automated stage for placing a sample and a focusing system. The focusing system comprises a processor and a memory communicatively coupled to the processor, wherein the memory stores the processor-executable instructions, which, on execution, causes the processor to receive a first image of a sample in an automated stage of the microscopic imaging system, wherein the first image is captured at a first focus position. The processor also receives a second image of the sample in the automated stage, wherein the second image is captured at a second focus position. Upon receiving the first image and the second image, the processor identifies a difference image based on difference in pixel values of the first image and the second image. Thereafter, the processor identifies a direction of focus and optimal focus position for the difference image based on information associated with plurality of historic difference images for focusing the sample. further, the processor enables the automated stage to move towards the direction of focus and position at the optimal focus position to capture a focused image of the sample.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the leftmost digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1A:
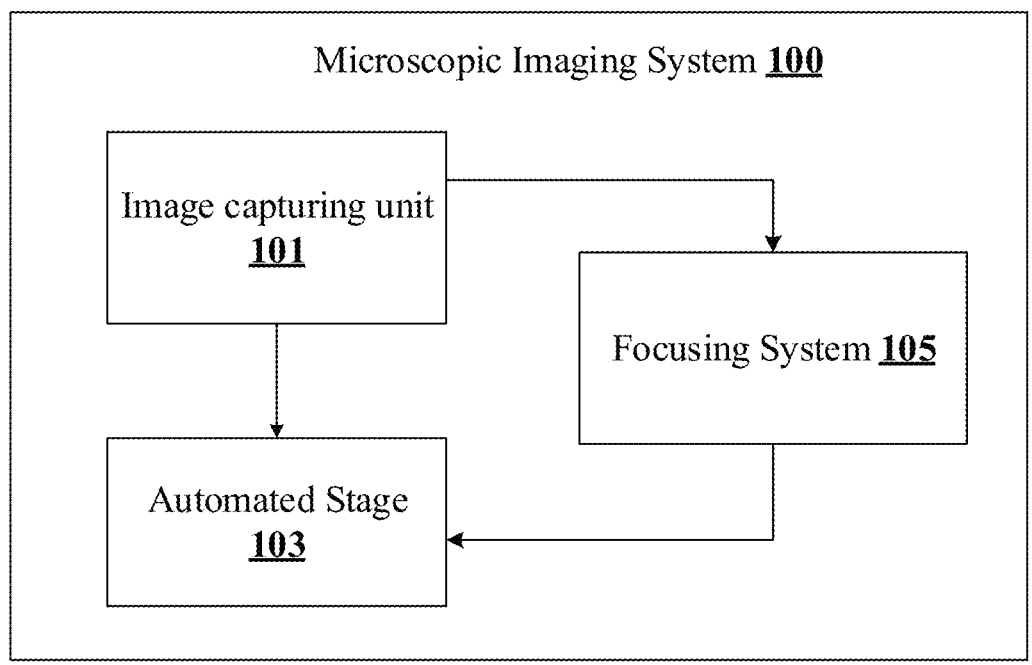
FIG. 1a shows block diagram of a microscopic imaging system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and system for autofocusing a microscopic imaging system. The microscopic imaging system may be a digital microscope. The focusing system [alternatively referred as system] may receive a first image of a sample and a second image of a sample. The sample is placed in an automated stage of the microscopic imaging system for review. The first image may be captured at a first focus position by an image capturing unit of the microscopic imaging system. The second image may be captured at a second focus position by the image capturing unit. In an embodiment, the first image and the second image may be captured from same Field of View (FOV) of the sample. Upon receiving the first image and the second image, the system may identify a difference image. The difference image may be identified based on difference in pixel values of the first image and the second image. The system may identify a direction of focus and optimal focus position for the difference image based on information associated with plurality of historic difference images. The information may include the plurality of historic difference images, direction of focus associated with each of the plurality of historic difference images and optimal focus position of each of the plurality of historic difference images. The plurality of historic difference images along with the information of direction of focus and the optimal focus position are used to train machine learned regression system which includes, but not limited to, a Convolution Neural Network (CNN). Once the CNN is trained, the focusing system using CNN may identify the direction of focus and the optimal focus position for the difference image provided in real-time. Thereafter, the system may facilitate the automated stage to move towards the direction of focus and the optimal focus position for capturing the image. The optimal focus position may be the position at which the image captured is sharpest. The present disclosure facilitates in moving the automated stage towards an optimal focus distance to achieve best focus of the sample.

FIG. 1a shows block diagram of a microscopic imaging system in accordance with some embodiments of the present disclosure.

The microscopic imaging system 100 may comprise an image capturing unit 101, an automated stage 103 and a focusing system 105. The microscopic imaging system 100 may be a digital microscope. The automated stage 103 may be configured to hold the sample. The sample may include, but is not limited to, blood sample, tissue sample, urine sample, microorganisms and any other sample which requires microscopic review for analysis. The automated stage 103 may be configured to move along vertical axis to find optimal focus position for capturing a sharpest image of the sample. The image capturing unit 101, for example, a camera may be configured to capture images of the sample in the automated stage 103. In an embodiment, the focusing system 105 may include a processor and a memory [not shown in FIG. 1a]. The focusing system 105 may receive a first image of the sample from the image capturing unit 101, wherein the first image is captured at a first focus position. The focusing system 105 may also receive a second image of the sample wherein the second image is captured at a second focus position by the image capturing unit 101. In an embodiment, the focus positions Z1 and Z2 may be upwards or downwards from a reference focus position. The reference focus position may be an optimal focus position obtained from previous Field of View (FOV) of the sample at which focused image may be captured. The focusing system 105 may receive the first image and the second image through I/O interface of the focusing system 105. Thereafter, the focusing system 105 may identify a difference image based on the first image and the second image. The difference image may be identified based on difference in pixel values of the first image and the second image. As an example, the first image I1 of the sample may be captured at first focus position Z1, for example, at −4 microns and the second image I2 may be captured at a second focus position Z2, for example, at −2 microns as shown in FIG. 1c. As shown in FIG. 1c, Z1 and Z2 may be estimated from a reference focus position Z'. The difference image may be I2-I1 which is I. The difference image I is obtained based on difference in pixel values of the first image and the second image. Once the difference image is obtained, the focusing system 105 may identify direction of focus and optimal focus position for the difference image based on the information associated with plurality of historic difference images using the CNN. The information may include the plurality of historic difference images, direction of focus associated with each of the plurality of historic difference images and optimal focus position of each of the plurality of historic difference images Each of the plurality of historic difference images along with direction of focus and the optimal focus position is used to train CNN. Once the CNN is trained, the focusing system 105 using CNN may identify the direction of focus and the optimal focus position for the difference image provided in real-time. Thereafter, the focusing system 105 may facilitate the automated stage 103 to move towards the identified direction of focus and position at the optimal focus position to capture a focused image.

Figure 1B:
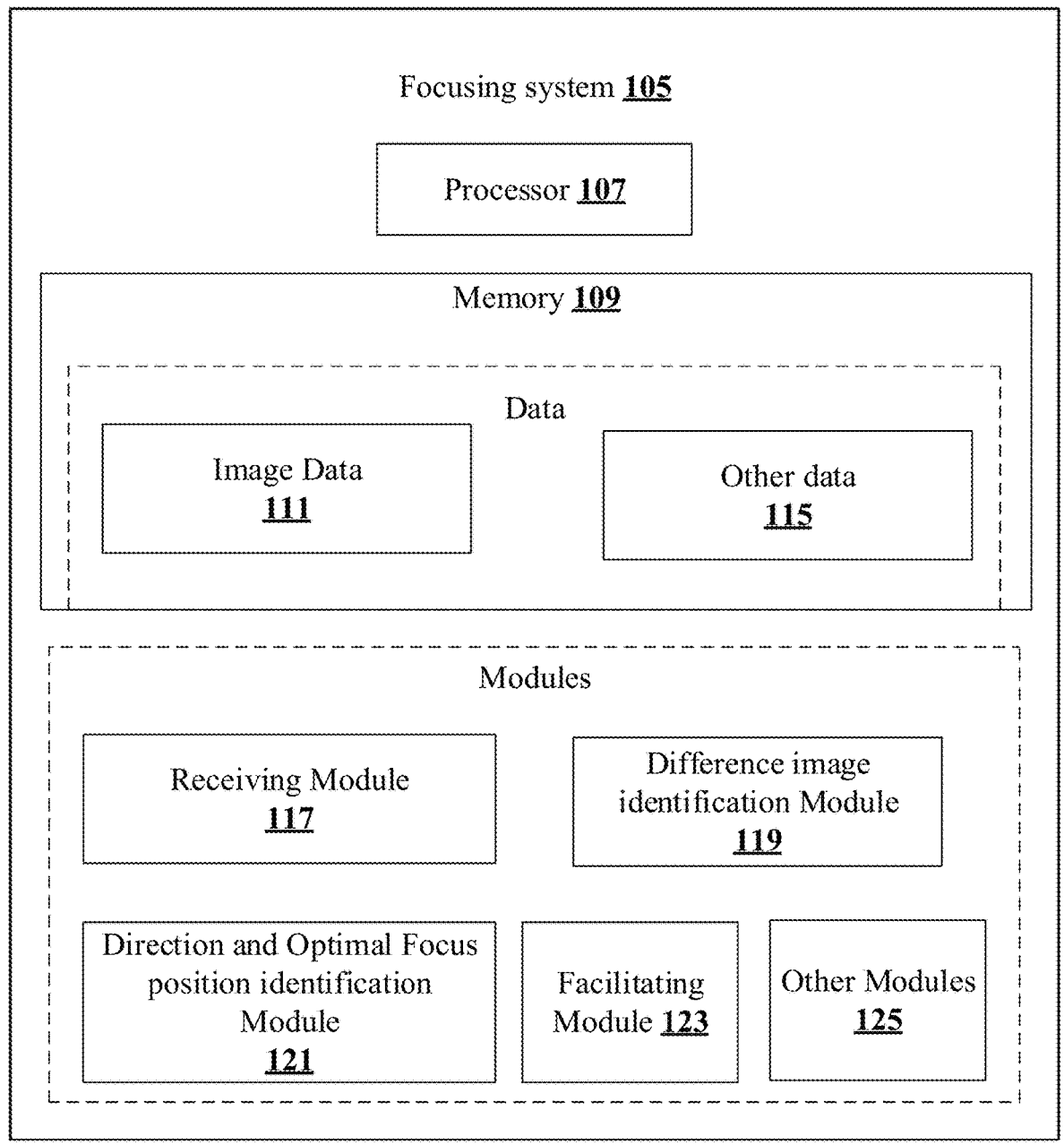
FIG. 1b shows block diagram of a focusing system in accordance with some embodiments of the present disclosure.
Figure 1C:
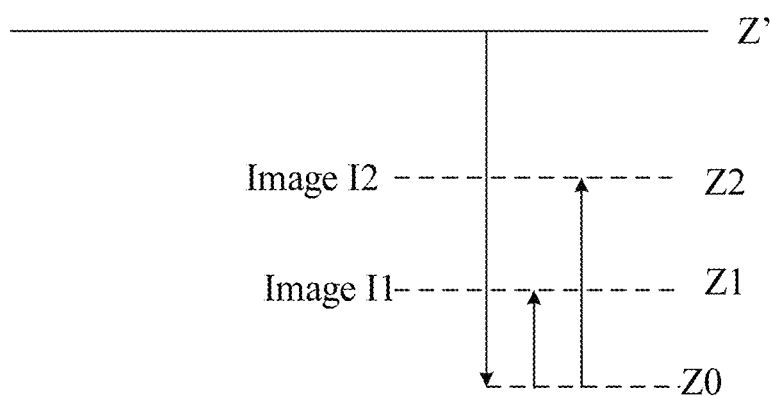
FIG. 1c shows an exemplary representation of two focus positions for image capturing in accordance with some embodiments of the present disclosure.

FIG. 1b shows block diagram of a focusing system in accordance with some embodiments of the present disclosure.

In some implementations, the focusing system 105 may include data and modules. As an example, the data is stored in a memory 109 configured in the focusing system 105 as shown in the FIG. 1b. In one embodiment, the data may include image data 111 and other data 115. In the illustrated FIG. 1b, modules are described herein in detail.

In some embodiments, the data may be stored in the memory 109 in form of various data structures. Additionally, the data can be organized using data models, such as relational or hierarchical data models. The other data 115 may store data, including temporary data and temporary files, generated by the modules for performing the various functions of the focusing system 105. As an example, the other data may also store information about image capturing unit 101 being used in the microscopic imaging system 100 and may also store information about optimal focus positions in previous field of view.

In some embodiments, the data stored in the memory 109 may be processed by the modules of the focusing system 105. The modules may be stored within the memory 109. In an example, the modules communicatively coupled to the processor 107 configured in the focusing system 105 may also be present outside the memory 109 as shown in FIG. 1b and implemented as hardware. As used herein, the term modules may refer to an Application Specific Integrated Circuit (ASIC), an electronic circuit, a processor 107 (shared, dedicated, or group) and memory 109 that execute one or more software or firmware programs, a combinational logic circuit, and/or other suitable components that provide the described functionality.

In some embodiments, the modules may include, for example, a receiving module 117, a difference image identification module 119, a direction and optimal focus position identification module 121, a facilitating module 123 and other modules 125. The other modules 125 may be used to perform various miscellaneous functionalities of the focusing system 105. It will be appreciated that such aforementioned modules may be represented as a single module or a combination of different modules.

As used herein, the term module refers to an Application Specific Integrated Circuit (ASIC), an electronic circuit, a processor 107 (shared, dedicated, or group) and that execute one or more software or firmware programs, a combinational logic circuit, and/or other suitable components that provide the described functionality. In an embodiment, the other modules 125 may be used to perform various miscellaneous functionalities of the focusing system 105. It will be appreciated that such modules may be represented as a single module or a combination of different modules. Furthermore, a person of ordinary skill in the art will appreciate that in an implementation, the one or more modules may be stored in the memory, without limiting the scope of the disclosure. The said modules when configured with the functionality defined in the present disclosure will result in a novel hardware.

In an embodiment, the receiving module 117 may be configured to receive images from the image capturing unit 101. The receiving module 117 may receive a first image and a second image from the image capturing unit 101. The first image may be captured at a first focus position and the second image may be captured at a second focus position. In an embodiment, distance between the first focus position and the second focus position is equal to or greater than focal depth of microscopic lens of the microscopic imaging system 100. As an example, the distance between the first focus position and the second focus position may be 2 microns. However, the distance between the first focus position and the second focus position may be pre-configured by a developer of the focusing system 105. In an embodiment, the first image and the second image may be captured from same Field of View (FOV) of the sample.

In an embodiment, the difference image identification module 119 may be configured to identify the difference image of the first image and the second image. The difference image identification module 119 may identify the difference image based on difference in pixel values of the first image and the second image. The information of the first image, second image and the difference image may be stored as image data 111. In an embodiment, the difference image may be smoothed to reduce local noise using a smoothing filter. Once the difference image is identified, a local contrast normalization technique may be performed on the difference image by changing pixel values to normalize the difference image. The Local Contrast Normalization (LCN) may be used to normalize contrast of an image in a non-linear way. LCN operates on patches of the image on a per pixel basis. This may be performed by taking mean value of pixel values and dividing by the variation of the pixel values.

In an embodiment, the direction and optimal focus position identification module 121 may be configured to identify the direction of focus and the optimal focus position to capture a focused image for the difference image based on information associated with plurality of historic difference images. In an embodiment, the plurality of historic difference images along with direction of focus and optimal focus position is provided to the machine learned regression system which includes, but not limited to, CNN for training the CNN. The trained CNN is then used to predict direction of focus and optimal focus position for the difference image provided to the focusing system 105 in real time.

As an example, a reference focus position Z' may be obtained which is the optimal focus position from previous FOV of the sample. From the reference focus position, the automated stage 103 may be moved towards a focus position Z0. From the focus position Z0, the automated stage 103 may be moved towards a first focus position Z1 wherein a first image is captured. Thereafter, the automated stage 103 may be moved towards the second focus position wherein the second image I2 is captured. The object features in I2 may be smaller than object features in I1. The difference image I may be obtained based on difference in pixel values of the first image and the second image. The difference image I=I2−I1.

In an embodiment, the facilitating module 123 may be configured to facilitate the automated stage 103 to move towards the identified direction of focus and position at the optimal focus position to capture a focused image.

In an embodiment for implementing the focusing system 105 in the microscopic imaging system 100 various optimization techniques are performed which are described as below.

1. Initial focus plane estimation

In an embodiment, initial focal plan for capturing the first image and the second image is estimated. To estimate the initial focal plane, the image capturing unit 101 may capture one or more images from one or more focus positions and identify Figure of Merit (FOM) value at each of the one or more focus positions. The FOM value represents a measure of effectiveness of the one or more images captured. Thereafter, the focusing system 105 may identify a focus position among the one or more focus positions with highest FOM value. The focus plane corresponding to the focus position with highest FOM value may be considered as the initial focal plane for capturing a focused image of the sample.

2. Prediction of quality estimation

In an embodiment, to obtain optimal focus position, the difference image may be split into one or more sub images. Thereafter, the focusing system 105 may identify a first distance value to reach optimal focus position for each of the one or more sub images such as d1-dn. Thereafter the focusing system 105 may identify a mean value ($\underline{d}$) based on the first distance value identified for each of the one or more sub images. Once the mean value is computed, the focusing system 105 may compute a standard deviation value for each of the one or more sub images such as ($S_1$-$S_n$) and compute a weighted average value ($\Sigma S_i$) based on the standard deviation of the pixel values of each of the one or more sub images wherein weights are based on standard deviation of each of the one or more sub images Thereafter, the focusing system 105 may compute a second distance value for each of the one or more sub images by associating each of the first distance values of each of the one or more sub images with corresponding standard deviation values and then compute a total second distance value ($\Sigma S_i d_i$) based on the second distance value of each of the one or more images. Thereafter, the focusing system 105 may predict a final distance value (d) based on the weighted average value and the total second distance value as shown below in Equation 1.

The final distance value, $d=(\Sigma S_i d_i)/\Sigma S_i$      Equation 1

In an embodiment, the focusing system 105 may estimate quality (q) of the final distance value based on the first distance value, the mean value and the weighted average value of each of the one or more sub images as shown below in Equation 2.

$q=\sqrt{\Sigma(d_i-\underline{d})^2 S_i/\Sigma S_i}$      Equation 2

In an embodiment, the focusing system 105 may estimate the quality of the final distance value as optimal when the quality is less than a threshold value. If the quality is equal to or greater than the threshold value, then the focusing system 105 may re-capture the first image and the second image.

3. Preventing drift from focal plane

In an embodiment, the focusing system 105 may identify plurality of focus plane locations for capturing the first image and the second image at one or more Field of View (FOV) of an image capturing unit 101. The focusing system 105 may identify optimal focus positions for each of the plurality of focus plane locations and obtain mean value of the optimal focus positions of each of the one or more plurality of focus plane locations. Once the mean value is identified, the focusing system 105 may detect whether the identified optimal focus position at one of the one or more focus plane locations is at an unsafe focus position. The unsafe focus position may be a predefined value from the mean value. As an example, the predefined value may be 5 microns. If the identified optimal focus position at one of the one or more focus plane locations is at the unsafe focus position, the focusing system 105 may identify optimal focus distance from the mean value of the optimal focus positions as a starting point. The optimal focus distance may be desirable focus distance for capturing a focused image. From the starting point, the first image and the second image may be captured.

4. Handling Backlash

In an embodiment, the backlash may arise when there is change in direction of focus while capturing the images. The backlash may arise in two cases:

a) The automated stage 103 may be moved downwards from a focus position by Z1. The focus direction may then be changed, and the automated stage 103 may be moved by some distance, say 2 microns upwards to reach focus position Z2. Z2 is considered as Z1+2 microns. Due to backlash, the difference between Z1 and Z2 may not be exactly 2 microns and hence the optimal focus position may not be identified accurately.

b) The optimal focus position may be predicted downwards from the focus position and hence the automated stage 103 may be moved downwards. However, the stage may be moved upwards from Z1 to Z2 and hence there is a change in the direction of focus. Therefore, the automated stage 103 may not move for the required amount of 2 microns and hence the optimal focus position may not be predicted accurately.

In an embodiment, to avoid backlash, the focusing system 105 may first retrieve a reference focus position Z' from previous field of view of the image capturing unit 101. Thereafter, the focusing system 105 may facilitate the automated stage 103 to move in a first direction by a distance Z0 from the reference focus position Z'. The first direction may be one of upwards or downwards from a reference focus position Z'. Thereafter, the automated stage 103 may be facilitated to move in an opposite direction to the first direction to a position Z1 from Z0 and the image may be captured at the position Z1. Further, the automated stage 103 may be facilitated to move in the opposite direction a position Z2 from Z1 and image may be captured at position Z2. The distance between Z1 and Z2 is exactly 2 microns since there is no change of direction while moving from Z1 to Z2.

In an embodiment, the focusing system 105 may detect change in direction of focus from the position Z2. Therefore, the focusing system 105 may facilitate the automated stage 103 to move in a first direction to a position Z3 from Z2. Further, the focusing system 105 may facilitate the automated stage 103 to move in the opposite direction to the first direction to a position Z1' from Z3 to capture an image at the position Z1'. Thereafter, the focusing system 105 may facilitate the automated stage 103 to move in the opposite direction to a position Z2' from Z1' to capture the image at position Z2' thereby avoiding backlash. In an embodiment, distance value to Z3 may be twice the distance value from Z2'.

As an example, the reference focus position may be Z'. The focusing system 105 may facilitate the automated stage 103 to move in a first direction by a distance Z0 from the reference focus position Z'. As an example, the first direction may be downwards. Therefore, the automated stage 103 may be facilitated to move in an opposite direction to the first direction which is upwards to a position Z1 from Z0 and the image may be captured at the position Z1. Further, the automated stage 103 may be facilitated to move in the opposite direction to the first direction which is upwards to a position Z2 from Z1 and image may be captured at position Z2. Further, the focusing system 105 may identify a change in direction of focus from position Z2 which is downwards. Therefore, the focusing system 105 may facilitate the automated stage 103 to move in a first direction which is downwards to a position Z3 from Z2. Further, the focusing system 105 may facilitate the automated stage 103 to move in the opposite direction to the first direction which is upwards to a position Z1' from Z3 to capture an image at the position Z1'. Thereafter, the focusing system 105 may facilitate the automated stage 103 to move in the opposite direction to the first direction which is upwards to a position Z2' from Z1' to capture the image at position Z2'.

Figure 2:
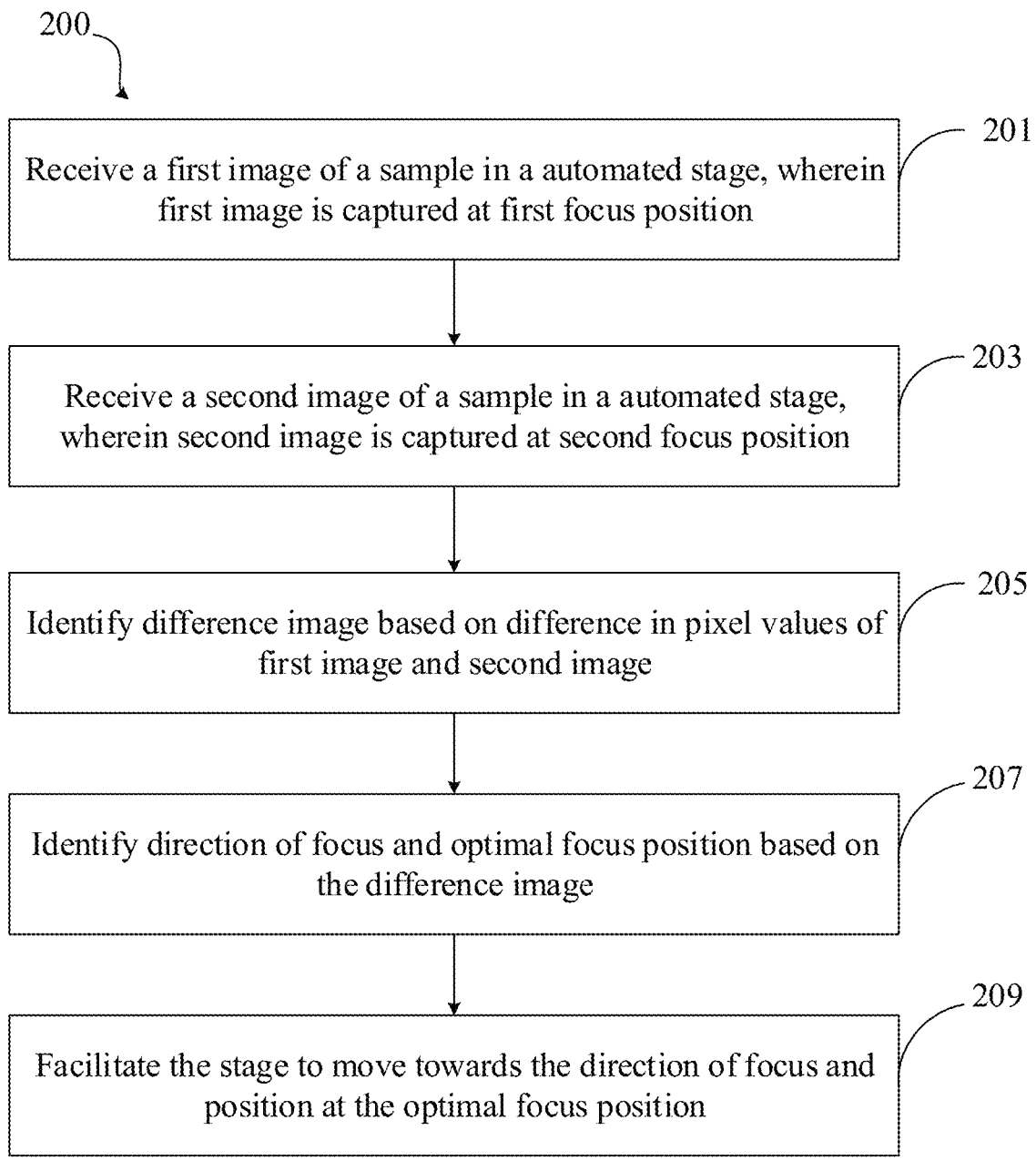
FIG. 2 shows a flowchart illustrating method for auto focusing a microscopic imaging system in accordance with some embodiments of the present disclosure.

FIG. 2 shows a flowchart illustrating a method for auto focusing microscopic imaging system in accordance with some embodiments of the present disclosure.

As illustrated in FIG. 2, the method 200 includes one or more blocks illustrating a method for auto focusing a microscopic imaging system 100. The method 200 may be described in the general context of computer executable instructions. Generally, computer executable instructions can include routines, programs, objects, components, data structures, procedures, modules, and functions, which perform specific functions or implement specific abstract data types.

The order in which the method 200 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 201, the method may include receiving a first image from an image capturing unit 101. The first image may be captured at a first focus position.

At block 203, the method may include receiving a second image from an image capturing unit 101. The second image may be captured at a second focus position.

At block 205, the method may include identifying difference image based on the first image and the second image. The difference image may be identified based on difference in pixel values of the first image and the second image.

At block 207, the method may include identifying direction of focus and optimal focus position for the difference image based on information associated with plurality of historic difference images. The plurality of historic difference images along with information of direction of focus and the optimal focus position are used to train the CNN. The focusing system 105 may identify the direction of focus and the optimal focus position for the difference image using the trained CNN.

At block 209, the method may include facilitating the automated stage 103 to move towards the identified direction of focus and position at the optimal focus position to capture a focused image.

Computer System

Figure 3:
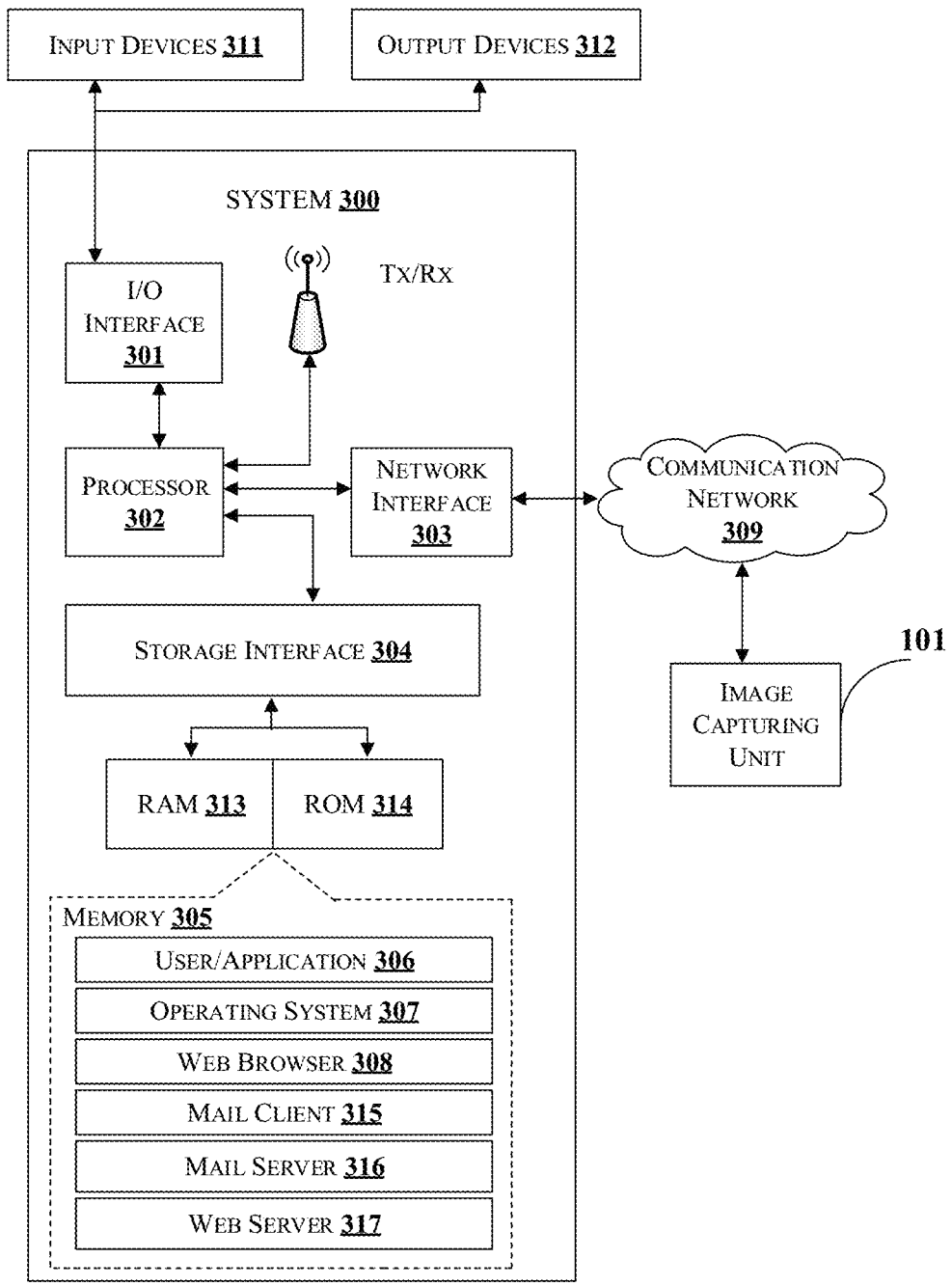
FIG. 3 illustrates a block diagram of an exemplary computer system for implementing embodiments consistent with the present disclosure.

FIG. 3 illustrates a block diagram of an exemplary computer system 300 for implementing embodiments consistent with the present disclosure. In an embodiment, the computer system 300 may be focusing system 105, which is used for focusing microscopic imaging system 100. The computer system 300 may include a central processing unit ("CPU" or "processor") 302. The processor 302 may comprise at least one data processor for executing program components for executing user or system-generated business processes. The processor 302 may include specialized processing units such as integrated system (bus) controllers, memory management control units, floating point units, graphics processing units, digital signal processing units, etc.

The processor 302 may be disposed in communication with one or more input/output (I/O) devices (311 and 312) via I/O interface 301. The I/O interface 301 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 301, the computer system 300 may communicate with one or more I/O devices 311 and 312. In some implementations, the I/O interface 301 may be used to connect to an image capturing unit 101 to receive captured images.

In some embodiments, the processor 302 may be disposed in communication with a communication network 309 via a network interface 303. The network interface 303 may communicate with the communication network 309. The network interface 303 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 309 can be implemented as one of the several types of networks, such as intranet or Local Area Network (LAN) and such within the organization. The communication network 309 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 309 may include a variety of network devices, including routers, bridges, servers, computing devices, storage devices, etc.

In some embodiments, the processor 302 may be disposed in communication with a memory 305 (e.g., RAM 313, ROM 314, etc. as shown in FIG. 3) via a storage interface 404. The storage interface 304 may connect to memory 305 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 305 may store a collection of program or database components, including, without limitation, user/application 306, an operating system 307, a web browser 308, mail client 315, mail server 316, web server 317 and the like. In some embodiments, computer system 300 may store user/application data 306, such as the data, variables, records, etc. as described in this invention. Such databases may be implemented as fault-tolerant, relational, scalable, secure databases such as Oracle® or Sybase®.

The operating system 307 may facilitate resource management and operation of the computer system 300. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS' (E.G., RED HAT™, UBUNTU™, KUBUNTU™, etc.), IBM™ OS/2, MICROSOFT™ WINDOWS™ (XP™ VISTA™/7/8, 10 etc.), APPLE® IOS™, GOOGLE® ANDROID™, BLACK-BERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™ JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Exemplary Experimental Results

The present disclosure provides results on incoherent white light images from input data set.

In an embodiment, the focusing system 105 is trained with two set of inputs, single image input and difference image input. The results are described below.

Single Image Input

For fair comparison with data sets used in prior arts, the results based on single image input are presented in Table 1.

TABLE 1

| Test set | Current work (RGB only) (μM) | Prior Art (RGB only) (μM) | Prior Art (best overall) (μM) |
|---|---|---|---|
| Same protocol | 0.31 ± 0.23 | 0.50 ± 0.32 | 0.46 ± 0.34 |
| Different protocol | 0.77 ± 0.79 | 1.94 ± 1.91 | 0.53 ± 0.59 |

Table 1. Focusing errors (absolute difference between predicted and ground truth focusing distance for an image) obtained using RGB images for training, compared with those presented in prior art data set. The best overall figures for prior art data set refer to results on incoherent illumination images only, whether RGB only or multi domain. The figures are represented as mean error±standard deviation of error.

The results are expressed in terms of focusing error, i.e. the absolute difference between the predicted focusing distance and the ground truth. For the test images which are larger in size, sub-images of size 224×224 pixels are split. The median of the predicted focus distance for these sub-images are taken as the focusing distance of the overall image.

The focusing system 105 performs significantly better on the RGB versions reported in data set. However, the results fall short of the best overall figures reported on the test set prepared with different protocol.

Difference Image Input

The results of the focusing system 105 trained with the difference image input are presented in Table 2.

TABLE 2

| Test set | Current work (Difference image) (μM) | Prior Art (RGB only) (μM) | Prior Art (best overall) (μM) |
|---|---|---|---|
| Same protocol | 0.29 ± 0.25 | 0.50 ± 0.32 | 0.46 ± 0.34 |
| Different protocol | 0.46 ± 0.37 | 1.94 ± 1.91 | 0.53 ± 0.59 |

Table 2. Focusing errors (absolute difference between predicted and ground truth focusing distance for an image) obtained using difference images for training, compared with those presented in data set of prior arts. The best overall figures for data set of prior arts refer to results on incoherent illumination images only, whether RGB only or multi domain. Figures represented as mean error+/−standard deviation of error.

The present disclosure shows the ability of the difference image to suppress non-essential features of the image while learning, and thereby improving generalisation ability. For the test images prepared with same protocol, the $98^{th}$ percentile error was 0.97 μM. The maximum error was 1.23 μM. For the test images prepared with different protocol, the $90^{th}$ percentile error was 0.96 μM whereas the $95^{th}$ percentile error was 1.16 μM. The maximum error was 2.98 μM.

Advantages of the Present Disclosure

The present disclosure provides method and system for autofocusing microscopic imaging system.

The present disclosure provides a method to reach optimal focal plane during microscopic examination to capture a focused image.

The focusing system disclosed in present disclosure may be implemented in any digital microscopic imaging system.

The present disclosure can be implemented with incoherent white light images and does not require coherent illumination. Hence the present disclosure can be implemented in cost-effective microscopic imaging systems.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Microscopic Imaging system |
| 101 | Image capturing unit |
| 103 | Automated Stage |
| 105 | Focusing System |
| 107 | Processor |
| 109 | Memory |
| 111 | Image Data |
| 115 | Other Data |
| 117 | Receiving module |

-continued

| Reference Number | Description |
| --- | --- |
| 119 | Difference image identification module |
| 121 | Direction and optimal focus identification module |
| 123 | Facilitating module |
| 125 | Other Modules |

The invention claimed is:

1. A method for auto focusing a microscopic imaging system, the method comprising:

receiving, by a focusing system of a microscopic imaging system, a first image of a sample in an automated stage of the imaging system, wherein the first image is captured at a first focus position;

receiving, by the focusing system, a second image of the sample in the automated stage, wherein the second image is captured at a second focus position;

identifying, by the focusing system, a difference image based on difference in pixel values of the first image and the second image;

identifying, by the focusing system, a direction of focus and optimal focus position for the difference image based on information associated with plurality of historic difference images, wherein identifying the optimal focus position for the difference image comprises:

splitting the difference image obtained based on the first image and the second image into one or more sub images;

identifying a first distance value to reach optimal focus position for each of the one or more sub images;

computing a standard deviation value for each of the one or more sub images and computing a second distance value by computing a weighted average value for each of the one or more sub images by associating the first distance value of each of the one or more sub images with corresponding standard deviation values; and predicting a final distance value based on the weighted average value and the second distance value, wherein the optimal focus position is identified based on the predicted final distance value; and facilitating, by the focusing system, the automated stage to move towards the direction of focus and position at the optimal focus position to capture a focused image of the sample.

2. The method as claimed in claim 1, wherein the first image and the second image are captured from same Field of View (FOV) of the sample.

3. The method as claimed in claim 1, wherein the direction of focus and e optimal focus position is identified using a machine learned regression system which is trained using the information associated with the plurality of historic difference images.

4. The method as claimed in claim 1, wherein the information comprises plurality of historic difference images, direction of focus associated with the plurality of historic difference images and optimal focus position associated with the plurality of historic difference images.

5. The method as claimed in claim 1, wherein distance between the first focus position and the second focus position is equal to or greater than focal depth of microscopic lens of the microscopic imaging system.

6. The method as claimed in claim 1 further comprises:
estimating quality of the final distance value based on the first distance value, a mean value and the weighted average value of each of the one or more sub images.

7. The method as claimed in claim 6, wherein the quality of the final distance value is estimated as optimal when the quality is less than a threshold value.

8. The method as claimed in claim 7 further comprises re-capturing the first image and the second image when the quality is equal to or greater than the threshold value.

9. The method as claimed in claim 1 further comprises:
capturing one or more images from one or more focus positions; identifying Figure of Merit (FOM) value at each of the one or more focus positions; identifying a focus position, from the one or more focus positions, with highest FOM value; and identifying a focus plane, for capturing a focused image of the sample, corresponding to the focus position with highest FOM value.

10. The method as claimed in claim 1 further comprises:
identifying plurality of focus plane locations for capturing the first image and the second image at one or more Field of View (FOV) of an image capturing unit of the imaging system; identifying optimal focus positions for each of the plurality of focus plane locations;
obtaining mean value of the optimal focus positions of one or more of the plurality of focus plane locations;
detecting whether the identified optimal focus position at one of the one or more focus plane locations is at an unsafe focus position; and
identifying optimal focus distance from the mean value of the optimal focus positions as a starting point for capturing the first image and the second image upon detecting the identified optimal focus position at one of the one or more focus plane locations is at the unsafe focus position.

11. The method as claimed in claim 10, wherein the unsafe focus position is at a predefined value from the mean value.

12. The method as claimed in claim 1 further comprises:
retrieving a focus position from previous field of view of the image capturing unit;
facilitating the automated stage to move in a first direction by a distance Z0 from the focus position; facilitating the automated stage to move in an opposite direction to the first direction to a position Z1 from Z0 and capturing an image at the position Z1; and
facilitating the automated stage to move in the opposite direction to a position Z2 from Z1 and capturing the image at position Z2 thereby avoiding backlash.

13. The method as claimed in claim 12, wherein the first direction is one of upwards or downwards from a reference focus position.

14. The method as claimed in claim 12 further comprises:
detecting change in direction of focus from the position Z2;
facilitating the automated stage to move in the first direction to a position Z3 from Z2;
facilitating the automated stage to move in the opposite direction to the first direction to a position Z1' from Z3 and capturing an image at the position Z1'; and
facilitating the automated stage to move in the opposite direction to the first direction to a position Z2' from Z1' and capturing the image at position Z2' thereby avoiding backlash.

15. The method as claimed in claim 14, wherein distance value to Z3 is twice the distance value from Z2'.

16. A focusing system for auto focusing an imaging system, the focusing system comprising:
a processor; and
a memory communicatively coupled to the processor, wherein the memory stores processor-executable instructions, which, on execution, causes the processor to:
receive a first image of a sample in an automated stage of the imaging system, wherein the first image is captured at a first focus position;
receive a second image of the sample in the automated stage, wherein the second image is captured at a second focus position;
identify a difference image based on difference in pixel values of the first image and the second image;
identify a direction of focus and optimal focus position based on information associated with plurality of historic difference images, wherein identifying the optimal focus position for the difference image comprises:
splitting the difference image obtained based on the first image and the second image into one or more sub images;
identifying a first distance value to reach optimal focus position for each of the one or more sub images;
computing a standard deviation value for each of the one or more sub images and computing a second distance value by computing a weighted average value for each of the one or more sub images by associating first distance value of each of the one or more sub images with corresponding standard deviation values; and
predicting a final distance value based on the weighted average value and the second distance value, wherein the optimal focus position is identified based on the predicted final distance value; and
facilitate the automated stage to move towards the direction of focus and position at the optimal focus position to capture a focused image of the sample.

17. The focusing system as claimed in claim 16, wherein the first image and the second image are captured from same Field of View (FOV) of the sample.

18. The focusing system as claimed in claim 16, wherein the processor identifies direction of focus and the optimal focus position using a machine learned regression system which is trained using the plurality of historic difference images.

19. The focusing system as claimed in claim 16, wherein the information comprises plurality of historic difference images, direction of focus associated with the plurality of historic difference images and optimal focus position associated with the plurality of historic difference images.

20. The focusing system as claimed in claim 16, wherein the processor
estimates quality of the final distance value based on the first distance value, a mean value and the weighted average value of each of the one or more sub images.

21. The focusing system as claimed in claim 20, wherein the processor estimates the quality of the final distance value as optimal when the quality is less than a threshold value.

22. The focusing system as claimed in claim 21, wherein the processor initiates re-capturing the first image and the second image when the quality is equal to or greater than the threshold value.

23. The focusing system as claimed in claim 16, wherein the processor performs steps of:
    capturing one or more images from one or more focus positions;
    identifying Figure of Merit (FOM) value at each of the one or more focus positions;
    identifying a focus position, from the one or more focus positions, with highest FOM value; and
    identifying a focus plane, for capturing a focused image of the sample, corresponding to the focus position with highest FOM value.

24. The focusing system as claimed in claim 16, wherein the processor performs steps of:
    identifying plurality of focus plane locations for capturing the first image and the second image at one or more Field of View (FOV) of an image capturing unit of the imaging system;
    identifying optimal focus positions for each of the plurality of focus plane locations;
    obtaining mean value of the optimal focus positions of one or more of the plurality of focus plane locations;
    detecting whether the identified optimal focus position at one of the one or more focus plane locations is at an unsafe focus position; and
    identifying optimal focus distance from the mean value of the optimal focus positions as a starting point for capturing the first image and the second image upon detecting the identified optimal focus position at one of the one or more focus plane locations is at the unsafe focus position.

25. The focusing system as claimed in claim 24, wherein the unsafe focus position is at a predefined value from the mean value.

26. The focusing system as claimed in claim 16, wherein the processor performs steps of:
    retrieving a focus position from previous field of view of the image capturing unit;
    facilitating the automated stage to move in a first direction by a distance Z0 from the focus position;
    facilitating the automated stage to move in an opposite direction to the first direction to a position Z1 from Z0 and capturing an image at the position Z1; and
    facilitating the automated stage to move in the opposite direction to a position Z2 from Z1 and capturing the image at position Z2 thereby avoiding backlash.

27. The focusing system as claimed in claim 26, wherein the first direction is one of upwards or downwards from a reference focus position.

28. The focusing system as claimed in claim 26, wherein the processor performs steps of:
    detecting change in direction of focus from the position Z2;
    facilitating the automated stage to move in the first direction to a position Z3 from Z2; facilitating the automated stage to move in the opposite direction to the first direction to a position Z1' from Z3 and capturing an image at the position Z1'; and
    facilitating the automated stage to move in the opposite direction to the first direction to a position Z2' from Z1' and capturing the image at position Z2' thereby avoiding backlash.

29. The focusing system as claimed in claim 28, wherein distance value to Z3 is twice the distance value from Z2'.

30. A microscopic imaging system comprising:
    an image capturing unit configured to capture one or more images of a sample;
    an automated stage configured to hold the sample;
    a focusing system configured to:
        receive a first image of the sample in the automated stage, wherein the first image is captured at a first focus position;
        receive a second image of the sample in the automated stage, wherein the second image is captured at a second focus position;
        identify a difference image based on difference in pixel values of the first image and the second image;
        identify a direction of focus and optimal focus position for the difference image based on information associated with plurality of historic difference images, wherein identifying the optimal focus position for the difference image comprises:
            splitting the difference image obtained based on the first image and the second image into one or more sub images;
            identifying a first distance value to reach optimal focus position for each of the one or more sub images;
            computing a standard deviation value for each of the one or more sub images and computing a second distance value by computing a weighted average value for each of the one or more sub images by associating first distance value of each of the one or more sub images with corresponding standard deviation values; and
            predicting a final distance value based on the weighted average value and the second distance value, wherein the optimal focus position is identified based on the predicted final distance value; and
    facilitate the automated stage to move towards the direction of focus and position at the optimal focus position to capture a focused image of the sample.

* * * * *